Figure 1:
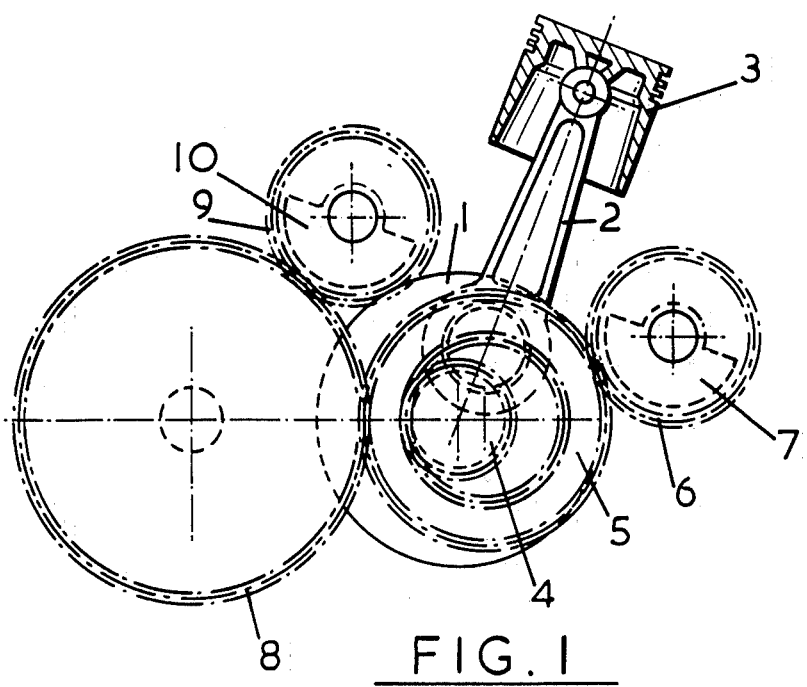

United States Patent [19]

Mitchell

[11] Patent Number: 4,572,025
[45] Date of Patent: Feb. 25, 1986

[54] BALANCING SYSTEM

[75] Inventor: Stephen W. Mitchell, Greater Manchester, United Kingdom

[73] Assignee: National Research Development Corp., London, England

[21] Appl. No.: 645,565

[22] Filed: Aug. 30, 1984

[30] Foreign Application Priority Data

Sep. 8, 1983 [GB] United Kingdom ............... 8324103

[51] Int. Cl.[4] .............................................. F16C 3/20
[52] U.S. Cl. ................................ 74/604; 74/665 GA; 123/192 B
[58] Field of Search ................. 74/603, 604, 665 GA; 123/192 R, 192 B

[56] References Cited

U.S. PATENT DOCUMENTS 2,905,011  9/1959  Armstrong et al. .......... 74/665 GA
3,511,110  5/1970  Grieve ................................ 74/604

FOREIGN PATENT DOCUMENTS 1165221  10/1958  France ............................... 74/603
  63148   5/1981  Japan ................................. 74/603
  26038  of 1911  United Kingdom ............... 74/604
2091814   8/1982  United Kingdom .

Primary Examiner—Kenneth J. Dorner
Attorney, Agent, or Firm—McDougall, Hersh & Scott

[57] ABSTRACT

A balancing system for use in for example a motorcycle engine to balance forces generated by a piston and connecting rod arrangement connected to a crankshaft. The crankshaft supports a first gear meshing with a second internal gear supported by an intermediate member such that the intermediate member rotates in the same direction as the crankshaft. The intermediate member supports a third external gear driving one or more balance shafts. In a single balance shaft arrangement, the external gear drives the balance shaft directly. In a twin balance shaft arrangement, the external gear drives one of the balance shafts directly and drives the other balance shaft via a further gear supported by a further intermediate member.

2 Claims, 2 Drawing Figures

U.S. Patent  Feb. 25, 1986  4,572,025

BALANCING SYSTEM

The present invention relates to a balancing system for balancing forces generated by a piston and connecting rod arrangement connected to a crackshaft. The balancing system is particularly applicable to the balancing of primary forces in single and twin cylinder engines but also has utility in other applications.

The use of twin rotating balance shafts to balance primary and/or secondary forces in internal combustion engines is well known. British Patent Specification No. 2 091 814 describes one such system in which two balance shafts are provided which are located beneath a crankshaft of an engine and driven in opposite directions to each other. There are however problems associated with the driving of two balance shafts, particularly in single and twin cylinder engines of the type used in motorcycles.

It is undesirable to place twin balance shafts underneath the crankshaft of a motorcycle engine because of the ground clearance which a motorcycle must have. In addition, as the balance shafts support eccentric balance weights the oil in the crankcase is churned as the shafts rotate. It is therefore desirable to position the two balance shafts in such a way to avoid these problems and accordingly it is known to position the balance shafts above the crankshaft centreline. As the two balance shafts must rotate in opposite directions, it is known to driven one balance shaft by means of gearing and to drive the other balance shaft by means of a chain from the crankshaft. It is not possible to have a gear on one balance shaft meshing direction with a gear on the other balance shaft because the distance between them is too great. It can be seen, therefore, that the driving of twin contrarotating balance shafts can only be achieved either by a plurality of gears or by means of gears and chains, both of which arrangements add weight and cost to an engine.

It is an object of the present invention to provide an improved balancing system.

According to the present invention there is provided a balancing system comprising at least one balance shaft driven from a crankshaft, the crankshaft supporting a first gear meshing with a second internal gear supported by an intermediate member such that the intermediate member rotates in the same direction as the crankshaft, and the intermediate member supporting a third external gear driving said at least one balance shaft.

Preferably the third external gear supported by the intermediate member meshes with a fourth gear supported by one of the balance shafts and a fifth gear supported by a further intermediate member such that the said one balance shaft and the said further intermediate member rotate in the opposite direction to the crankshaft, the fifth gear meshing with a sixth gear supported by the other balance shaft such that the said other balance shaft rotates in the same direction as the crankshaft.

The fifth gear of the further intermediate member may be the clutch and gearbox input gear on a motorcycle engine.

Figure 2:
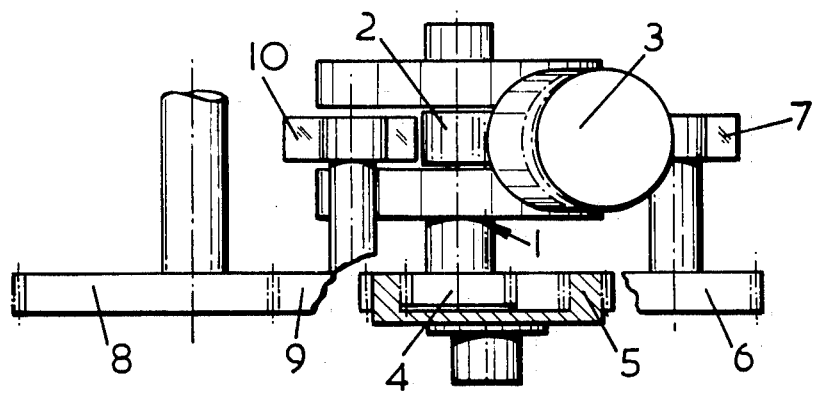

An embodiment of the present invention will now be described by way of example with reference to the accompanying drawings, in which:

FIG. 1 is a schematic end view of a motorcycle engine embodying the invention and showing the balance shaft driving gear train together with the crankshaft connecting rod and piston; and FIG. 2 is a plan view of components of the engine schematically illustrated in FIG. 1.

Referring to FIGS. 1 and 2, a crankshaft 1 is driven via a connecting rod 2 by a piston 3. A gear 4 is mounted on the crankshaft 1 and drives an internal gear of a first intermediate member 5. An external gear on member 5 drives a gear 6 mounted on a balance shaft to which is attached balance weight 7. The external gear on member 5 also drives a gear mounted on a second intermediate member 8 which in turn drives a gear 9 mounted on a balance shaft to which is attached balance weight 10. Thus the crankshaft 1, intermediate member 5 and balance weight 10 rotate in one direction, whereas the intermediate member 8 and balance weight 7 rotate in the opposite direction. With this arrangement the primary forces associated with the movement of the piston 3 and connecting rod 2 can be balanced.

In a conventional motorcycle engine intermediate member 8 is the clutch and gearbox input drive and so is an existing part. The intermediate internal/external gear member 5 is supported on one set of bearings and thus it can be seen that the described arrangement provides a compact way of driving two contrarotating balance shafts without a combination of gears and chains and without a train of spur gears with their respective bearings.

In practice, the intermediate internal/external gear member 5 would be fabricated from two members, one of which would support the internal and external gears and the other of which would be a flanged stub shaft attached to the internal and external gear support. This would mean that the gears could be made by production methods, i.e. the internal gear could be broached and the external gear cut and ground and then the gear support could be attached to the flanged stub shaft by means of screws or rivets or by electron beam welding. The gear could be made from a nitriding steel and the teeth hardened by nitriding. There are nitriding processes which avoid the 'white' layer previously associated with this process and this means that no laborious removal of this layer is now necessary. Thus the intermediate internal and external gear supporting member could be produced at acceptable cost.

It will be appreciated that although in the described embodiment the balance shafts rotate at a constant angular velocity assuming a constant crankshaft angular velocity in which the angular velocities of the balance shafts varies relative to that of the crankshaft in accordance with the above-mentioned British Patent Specification No. 2 091 814.

In the arrangement illustrated two balance shafts are provided. The present invention can however be applied to a single balance shaft system driven by gears 4, 5 and 6. The advantage of using the three gears 4, 5 and 6 rather than a simple arrangement of two meshing spur gears one placed on the crankshaft and the other placed on the balance shaft is that, because of the relative diameters of the gears, the two gear arrangement results in a gear to surface speed approximately 27% greater than the three gear arrangement. Thus use of the three gears 4, 5 and 6 result in less gear noise. This advantage of less gear noise is also present in embodiments incorporating twin balancing shafts.

I claim:

1. A balancing system comprising two balance shafts driven from a crankshaft, the crankshaft supporting a first gear meshing with a second internal gear supported by an intermediate member such that the intermediate member rotates in the same direction as the crankshaft, the intermediate member supporting a third external gear meshing with a fourth gear supported by one of the balance shafts and a fifth gear supported by a further intermediate member such that the said one balance shaft and the said further intermediate member rotate in the opposite direction to the crankshaft, and the fifth gear meshing with a sixth gear supported by the other balance shaft such that the said other balance shaft rotates in the same direction as the crankshaft.

2. A balancing system according to claim 1, wherein the fifth gear supported by the second intermediate member is the clutch and gearbox input gear of a motorcycle engine.

* * * * *